Figure 1:
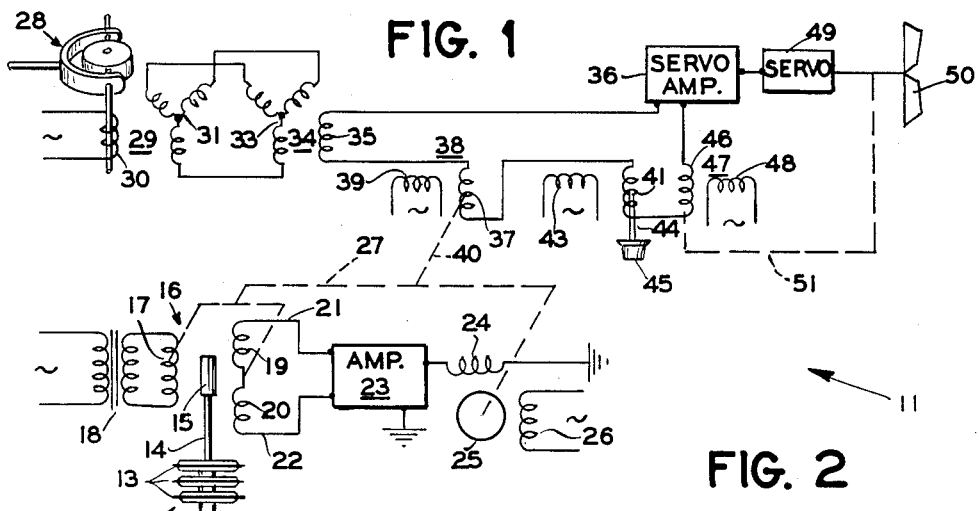

Oct. 27, 1953  F. H. S. ROSSIRE  2,657,350
ALTITUDE CONTROLLER UNIT
Filed April 11, 1951

INVENTOR.
FRANCIS HENRY S. ROSSIRE
BY
C. R. Miranda
ATTORNEY

Patented Oct. 27, 1953

2,657,350

UNITED STATES PATENT OFFICE 2,657,350

ALTITUDE CONTROLLER UNIT

Francis Henry S. Rossire, Leonia, N. J., assignor to Bendix Aviation Corporation, Teterboro, N. J., a corporation of Delaware Application April 11, 1951, Serial No. 220,497

11 Claims. (Cl. 318—31)

1

The present invention generally relates to automatic steering systems for aircraft and more particularly to a novel altitude controller for maintaining the craft automatically at a predetermined altitude level.

Altitude controller units of this general character usually consist of a housing containing pressure responsive means expansible and contractible in accordance with changes in ambient atmosphere and a signal generator operable thereby with some provision between the pressure responsive means and the generator to seal the latter from the ambient atmosphere affecting the pressure responsive means. One manner of sealing heretofore proposed, consists in the provision of a metal bellows rockable by the pressure responsive means through a first linkage arrangement located at one side of the bellows to transmit such motion to the generator through a secured linkage arrangement located the other side of the bellows. The above arrangement is undesirable because the linkages include an undue number of moving parts which are subject to wear and consequently affect the operation of the system. Furthermore, frequent replacement of the linkages increases the cost of the system.

The present invention contemplates a novel altitude controller having a housing containing an aneroid chamber which is separated and sealed from a second chamber containing the signal generator and other operating parts. A novel connection between the aneroid and the signal generator is utilized which eliminates the need of a mechanical connection therebetween and yet provides the desired seal between the two elements. Accordingly, the volumetric capacity of the aneroid chamber may be made as small as desired to increase the sensitivity of the aneroid to slight changes in atmospheric pressure. Furthermore, the instant arrangement prevents the air entering the aneroid chamber from contaminating the air of the second chamber.

An object of the present invention, therefore, is to provide a novel altitude control unit for an aircraft control system whereby the craft may be maintained automatically in a preselected altitude level.

Another object of the invention is to provide a novel seal proof connection between the aneroid and the signal generator of an altitude control unit.

A further object is to provide a novel structural arrangement wherein a signal generator, located outside of a chamber containing an aneroid, is actuated by the aneroid without any mechanical connection therebetween.

2

A still further object is to provide a novel structural arrangement wherein a balanced inductive device located in a chamber sealed from an aneroid chamber is adapted to be unbalanced by a movable member located in the aneroid chamber to produce an output for energizing driving means located in the first chamber for displacing the inductive device whereby the latter follows the movement of the movable member.

Still another object is to provide a novel connection between a pressure responsive aneroid and a signal generator which requires no moving parts.

The foregoing and other objects and advantages of the invention will appear more fully hereinafter from a consideration of the detailed description which follows, taken together with the accompanying drawing wherein a single embodiment of the invention is illustrated by way of example. It is to be expressly understood, however, that the drawing is for illustration purposes only and is not to be construed as defining the limits of the invention.

Figure 2:
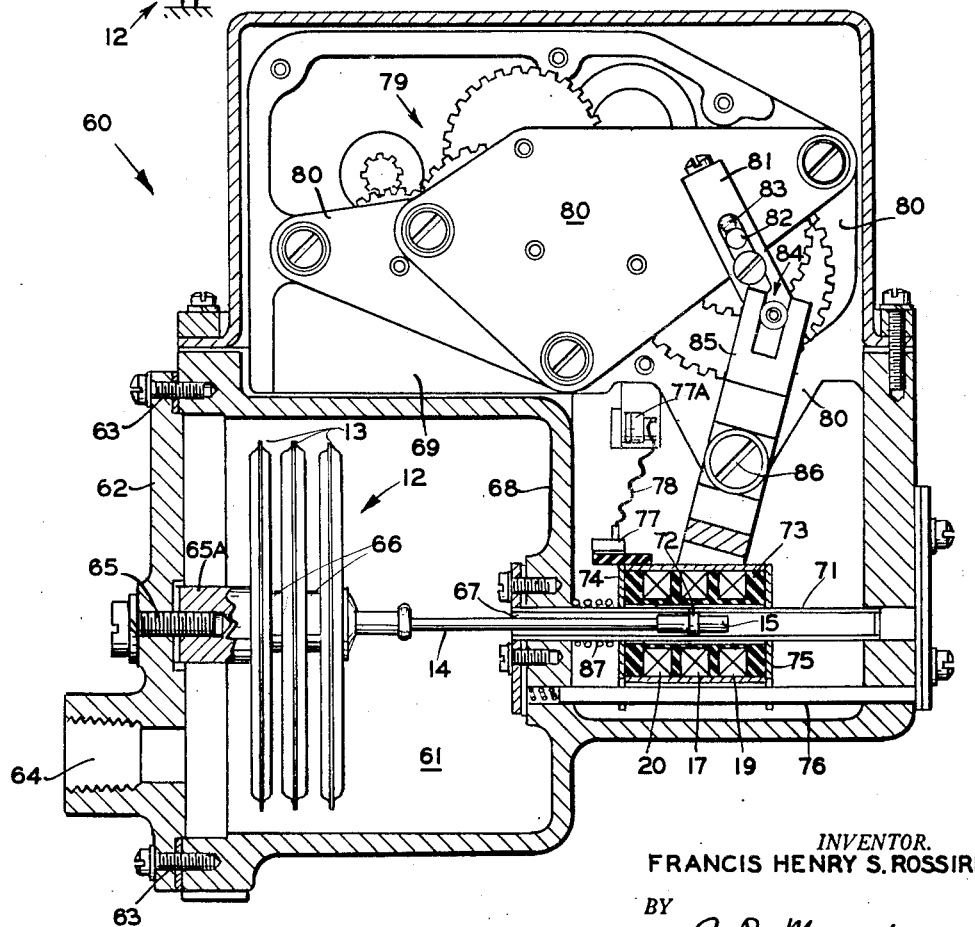

In the drawing wherein like reference numerals refer to like parts,

Fig. 1 is a diagrammatic representation of an aircraft control system in which the novel altitude controller hereof may be employed; and Fig. 2 is a side elevational view partly in cross section of the novel altitude controller constituting the present invention.

Referring now to the drawing for a more detailed description of the present invention and more particularly to Fig. 1 thereof, an altitude control system 11 is shown for the purpose of illustrating the operation of the controller unit hereof in connection with an aircraft automatic pilot. It is to be understood that the present invention may be utilized with any system wherein change in pressure affects a pressure member and it is desired to seal the chamber containing the pressure member from a chamber containing operating mechanism associated therewith. Since control system 11 is employed for controlling the altitude of a craft, an aneroid 12, comprising a plurality of evacuated capsules 13, is subjected to atmospheric pressure existing outside of the craft by a tube (not shown). Connected for displacement by aneroid 12 is a connecting rod 14 which has mounted at one end a soft iron core 15. Associated with core 15 is a variable output transformer 16, having a primary winding 17 which is energized by a power transformer 18 connected to a suitable source of alternating current.

Transformer 16 includes a pair of secondary windings 19 and 20 which are connected in such a manner that the voltages therein buck or oppose each other so that normally a zero signal output is obtained. This is true when the core 15 is in a centralized position with respect to the secondary windings since there is an equal amount of iron in each of the secondary windings. However, if core 15 is displaced in a direction away from winding 20, the voltage in winding 19 will be greater and therefore, a resultant output will be affected. If the core moves away from winding 19 then the voltage in winding 20 will be greater to effect a signal output opposite in phase to the signal from winding 19. The signal output from transformer 16 will be of a phase and magnitude determined by the direction and amount of displacement of core 15 from the centralized position.

Connected to receive the output of transformer 16 by way of conductors 21 and 22 is a conventional amplifier 23, shown as a box in Fig. 1, which contains a phase discriminator for discriminating the phase of the signal from the transformer. The output of amplifier 23 is fed to the variable phase winding 24 of a two phase reversible motor 25 having a fixed phase winding 26 constantly energized with alternating current. Motor 25 is driven in one direction or the other at a speed depending upon the direction and amount of displacement of core 15 from a centralized position with respect to the windings. A broken-line connection 27 representing a speed reduction gear train is shown connected to the motor 25 and transformer 16 and serves as a follow-up to return the secondaries of the latter to a no-signal producing position wherein the core 15 is centralized with respect to the windings.

Altitude control system 11 includes a vertical gyro 28 which has an inductive signal generator 29, the rotor winding 30 of which develops a signal in a three phase stator winding 31 upon relative angular displacement of the windings. The signal developed in stator winding 31 corresponds to the pitch attitude of the craft. Stator winding 31 is coupled back to back with a three phase stator winding 33 of an inductive signal generator 34, the latter including a single phase rotor winding 35. Rotor winding 35 may be supported for angular displacement relative to winding 32 by a control stick (not shown). In the system as shown and to be further described, the control stick is maintained in its null position. Rotor winding 35 is connected to the input of a conventional type servo amplifier 36, shown as a box, which includes a conventional phase discriminator. Also connected to winding 35 is a single phase rotor winding 37 of an inductive signal generator 38, the latter including a stator winding 39 connected to a source of alternating current. Rotor winding 37 is angularly displaced relative to stator winding 39 by motor 25 through connection 27 and a broken line connection 40 which represents a speed reduction gear train. Rotor winding 37 is connected to a rotor winding 41 of a reference signal generator which includes a single phase stator winding 43 connected to an alternating current source. Rotor winding 41 is supported on a rotor shaft 44 which has fixed to one end a manually operable altitude selector knob 45 for displacing winding 41 relative to stator winding 43. Connected to rotor winding 41 is a rotor winding 46 of a follow-up signal generator 47 having its stator winding 48 connected to an alternating current source. The output of rotor winding 46 is fed to amplifier 36, the output of the latter energizing a servo 49, shown as a box, for controlling the movement of an elevator control surface 50. Rotor winding 46 of follow-up generator 47 is angularly displaced relative to stator winding 48 through a broken-line connection 51 connected to the output of servo 49.

Considering the operation of the altitude control system, if it is desired to displace the craft from an elevation at which it is operating to higher elevation, knob 45 is actuated in the proper direction. The altitude selector is so designed that the angular positions of knob 45 correspond to certain altitudes. Actuation of knob 45 effects displacement of rotor winding 41 with respect to stator 43 whereby a signal of a phase and magnitude determined by the direction and amount of displacement of rotor 44 from a reference position is developed in the rotor winding and fed to amplifier 36. The output of amplifier 36 energizes servo 49, whereby displacement of elevator 50 is effected in a direction to move the craft upwardly. Since elevator 50 is displaced from a null or streamlined position, follow-up rotor winding 46 is also displaced to effect a signal which is opposite in phase to the signal from winding 41 to cancel the signal from the latter winding and maintain the elevator in its displaced position. As the craft moves upwardly, rotor winding 30 develops in stator winding 31 a pitch attitude signal opposite in phase to the signal from winding 41 so as to bring elevator 50 back to a streamlined position. The pressure affecting aneroid 12 decreases as the altitude of the craft increases whereby the aneroid expands to displace core 15 from its centralized position. Accordingly, secondary winding 19 develops a voltage output greater than that at secondary 20 to effect operation of motor 25 to displace transformer 16 through follow-up connection 27 in a direction to centralize the secondary windings 19 and 20 with respect to core 15. Simultaneously, rotor winding 37 is displaced by motor 25 through connections 27 and 40. The signal in winding 37 is of a phase opposite to the signal in winding 41 so that elevator 50 is displaced in an opposite direction to level off the craft. It may be readily understood that as the craft approaches its selected elevation, the signal from winding 37 gradually diminishes the signal from rotor winding 41 so that as the craft reaches its selected elevation the signal from the latter winding will be cancelled by the signal from the former winding to maintain the system in equilibrium. With the craft at its selected elevation, the signals from stator winding 31 and rotor winding 46 will be zero and the elevator 50 will be in a streamlined position. It is apparent that if the craft is displaced from its selected elevation by an updraft or downdraft the altitude control system will operate to bring the craft to its selected elevation.

It will be apparent to those skilled in the art that the altitude control system 11 may be utilized as an airspeed sensing system by connecting the interiors of capsules 13 to the impact pressure from a Pitot tube and subjecting the exterior portions of the capsules to the static pressure from the Pitot tube. In this case, the elements 28 to 51 may be eliminated and means for connecting the follow-up connection 27 to an airspeed indicator and/or an engine throttle servo unit for controlling airspeed may be substituted.

The present invention may be employed with any control servo system which employs a pressure responsive member subjected to varying atmospheric pressures. The altitude control system 11 is described in detail in order to clearly show one application to which the instant invention may be applied and the description of the control system 11 is not to be construed as defining the limits of the invention.

Coming now to the pressure controller of the present invention, the novel features thereof are shown in Fig. 2. Certain elements shown in Fig. 1 are disclosed in Fig. 2 and like reference numerals have been retained for purposes of clarity. The controller is shown in Fig. 2 as comprising a housing 60 fixed with respect to the craft and having a compartment or chamber 61 formed therein. One wall of housing 60 comprises a removable cover 62 fastened to the housing by threaded members 63 so as to seal the chamber from ambient pressures existing in the craft. An inlet port 64 is formed in cover 62 to permit entry of a tube (not shown) which is connected to the atmospheric pressure outside the aircraft. Connected to cover 62 by means of a threaded bolt 65 and stud 65A are the evacuated capsules 13 spaced apart and interconnected by spacers 66. It is apparent that by interconnecting the interiors of the capsules 13 to a tube connected with the impact pressure from a Pitot tube and subjecting the exteriors thereof to the static pressure from a Pitot tube the capsules may be utilized for sensing airspeed. The rod 14, which is connected for movement by the capsules 13, extends through an opening 67 formed in one wall 68 of housing 60 and into a sealed compartment or chamber 69 formed in the housing. Positioned in chamber 69 and fixed at one end to wall 68 is a hollow elongated cylindrical member or tube 71 in which a portion of rod 14 and core 15 slide. The end of tube 71 supported by wall 68 opens into chamber 61 while the other end is closed. By reason of the foregoing, air from chamber 61 may enter the interior of tube 71 but is sealed from chamber 69 so that moisture and foreign matter present in the air is prevented from entering the latter chamber. Since there is a very slight gap between a shoulder 72 on core 15 and the inside walls of the tube, no back pressure will be built up by the movement of the core to right as seen in Fig. 2.

Supported for sliding movement axially of tube 71 is a core 73 upon which the windings 17, 19 and 20 are wound. The core has an opening formed longitudinally thereof which permits tube 71 to serve as a support and bearing for the core. A pair of side plates 74 and 75 fixed to core 73 have slotted openings formed at the bottom to engage a guide rod 76 so as to prevent rotational movement of core 73. The output from secondary windings 19 and 20 are connected by way of conductors (not shown in Fig. 2) to a terminal post 77. A plurality of bent wires 78 (only one of which is shown) are connected to posts 77 and 77A to connect primary winding 17 with the A. C. source and to feed the output of the transformer 16 to the amplifier 23 (not shown in Fig. 2). The volumetric capacity of compartment 69 is large compared with compartment 60 and contains motor 25 (not shown in Fig. 2). The intermediate gearing comprising the follow-up connection 27 is generally designed by the numeral 79 in Fig. 2, and is supported within chamber 69 by supporting brackets 80. The follow-up connection 27 from motor 25 includes an arm 81 connected to the output shaft 82 of the intermediate gearing 79 driven by the motor. Arm 81 is secured to shaft 82 by a screw 83, the threaded portion of which threads into a tapped portion of the shaft, whereby movement of the shaft produces angular displacement of the arm. An adjustable pin slot connection 84 transmits movement of arm 81 to a follow-up lever 85 which pivots about a point 86. The lower portion of lever 85 is bifurcated to receive the transformer 16 and is connected thereto by means, not shown, to slide core 73 axially of the tube 71. A coiled spring member 87 is supported on tube 71 and is disposed between side plate 74 and wall 68 to take up any backlash in the follow-up connection.

Considering the operation of the structure described in Fig. 2, let it be assumed that knob 45 has been actuated to bring the craft to a higher elevation and elevator 50 is displaced from its null position in the proper direction. The pressure affecting capsules 13 decreases as the craft begins to climb thereby causing an expansion of the capsules. Accordingly, core 15 is displaced to the right (Fig. 2) from its centralized position to effect a signal from transformer 16 for driving motor 25 in a direction to displace arm 81 in a clockwise direction. Follow-up lever 85 is displaced angularly in a counter-clockwise direction to slide core 73 to the right so as to follow-up core member 15 and nullify the signal. When the craft is at its new elevation capsules 13 will cease to expand and the transformer 16 will again be centralized with respect to core 15 to maintain the system in equilibrium.

It may be readily understood by those skilled in the art that the instant invention provides a novel means for inductively connecting aneroid 12 with the variable output transformer or signal generator 16. In this manner, the need of a mechanical connection which includes an undue number of moving parts is eliminated. The utilization of a displaceable inductive device which follows the movement of the magnetic core 15 permits the inductive device to bring the system to a null as well as provide the control signal for maintaining a craft at a selected elevation. In addition, the novel connection also provides for a pair of chambers or compartments sealed from one another so that the volumetric capacity of one may be made as small as desired and the air in one chamber is prevented from affecting mechanism in the other chamber. It is readily apparent that the present invention is not limited to altitude control and airspeed sensing servo systems alone but may be employed with any servo systems having a pressure member subjected to varying pressures, and a signal developing inductive device.

Although but one embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

I claim:

1. In a controller, a hollow member, inductive means and core means slidable relative to one another, one of said means being positioned inside said member and the other means being positioned outside of said member, a barometric device on one side of said member connected for actuating one of said means relative to the other of said means to provide a signal corresponding to their relative displacement, and a motor on the other side of said member responsive to the signal and drivingly connected to the other of said means to cause the latter said means to follow the movement of said one means and nullify the signal.

2. A controller comprising, a sealed chamber, inductive means and core means slidable relative to one another, one of said means being positioned inside of said chamber and the other means being positioned outside of said chamber, said core means being arranged to unbalance said inductive means and provide a signal corresponding to the displacement of said core means relative to said inductive means, means on the same side of said chamber as said core means for moving said core means to develop a signal, and means on the same side of said chamber as said inductive means responsive to the signal and drivingly connected to said inductive means to cause said inductive means to follow movement of said core means and rebalance said inductive means to nullify the signal.

3. In a device of the kind described, a pressure member responsive to changes in atmospheric pressure, inductive means including a primary winding adapted to be energized by an alternating current source and a pair of secondary windings connected in series opposition, a core member actuated linearly by said pressure member relative to said inductive means to unbalance said inductive means and provide a signal, means responsive to the signal and drivingly connected to said inductive means to cause said inductive means to follow movement of said core member and nullify the signal, and a bounding wall separating said pressure responsive member and core member for said inductive means and said signal responsive means.

4. In a device of the kind described, a housing having a plurality of compartments, one of said compartments being subjected to the pressure to be measured and another compartment being subjected to ambient pressure, said one compartment including a hollow elongated member having one end closed and the other end opening into said one compartment, a pressure responsive member adapted to be actuated upon changes in the pressure to be measured, and, a core member connected for displacement by said pressure responsive member and slidable within said elongated member, said other compartment including inductive means associated with said core member and slidable on the outside of said elongated member relative to said core member, said inductive means upon movement of said core member providing a signal corresponding to their relative displacement, and means responsive to the signal and drivingly connected to said inductive means to move said inductive means so as to follow movement of said core member and nullify the signal.

5. An altitude controller for an aircraft, comprising a housing having a first compartment subjected to the pressure of the atmosphere and a second compartment being subject to ambient pressure, a hollow member closed at one end and having the hollow insides thereof in communication with said first compartment, a core element slidable within said hollow member, a pressure responsive means in said first compartment responsive to changes in atmospheric pressure for displacing said core element in said hollow member, inductive means associated with said core element and slidable in said second compartment on the outside of said hollow member relative to said core element, said core element and said inductive means being arranged so that when said core element is displaced relative to said inductive means, a signal is provided by said inductive means corresponding thereto, and driving means responsive to the signal and arranged to slide said inductive means on the outside of said hollow member relative to said core element on the inside of said hollow member to nullify the signal.

6. A pressure responsive controller comprised of a housing having a pair of compartments, one of said compartments being subjected to the pressure to be measured and having a pressure responsive member within said compartment which is adapted to be actuated by changes in said pressure, the other compartment having means extending into said one compartment forming a chamber which is closed from said other compartment and in communication with said one compartment, a core member connected for movement within said chamber by said pressure responsive member, inductive means positioned in said other compartment operatively associated with and movable relative to said core member for providing a signal corresponding to the relative displacement of said core and inductive means, and means responsive to the signal and drivingly connected to said inductive means for moving said inductive means relative to said core member to nullify the signal.

7. In a device of the kind described, a hollow elongated member having a bounding wall, inductive means slidable on one side of said wall, a core element slidable on the other side of said wall, means also on the other side of said wall for moving said core to unbalance said inductive means to provide a signal, means positioned on said one side of said wall and responsive to the signal for driving said inductive means to cause said inductive means to follow movement of said core element and nullify the signal, and a signal generator drivingly connected to said last-mentioned means for providing a signal corresponding to movement of said inductive means.

8. In a device of the kind described, a pressure member responsive to changes in atmospheric pressure, inductive means, a core member actuated linearly by said pressure member relative to said inductive means to unbalance said inductive means and provide a signal, a motor responsive to said signal and drivingly connected to said inductive means to cause said inductive means to follow movement of said core member and nullify the signal, a signal generator connected for actuation by said motor and adapted to provide a signal corresponding to the movement of said inductive means, and a sealed receptacle for enclosing said pressure responsive means and core member, said receptacle having an inlet for said atmospheric pressure.

9. A controller for developing a signal indicative of a change in pressure comprising a two-part device having one part movable relative to the other part for developing a signal, means responsive to a pressure to be measured connected to move one of said parts relative to the other to develop a signal indicative of a change in said pressure, means responsive to said signal for moving said other part to cancel said signal, and means enclosing said one part and said pressure responsive means so that said enclosed parts only are subjected to the pressure to be measured.

10. A controller responsive to air pressure comprising a sealed receptacle having an opening therein adapted to receive said air pressure, a two-part device for developing a signal upon relative movement of said two parts, one of said parts being within said receptacle and the other part being outside said receptacle, a pressure responsive device within said receptacle for moving said one part in response to change in pressure to develop a corresponding signal, and means outside said receptacle and responsive to said signal for moving said other part to cancel said signal.

11. An altitude controller comprising a first housing having an inside adapted to be subjected to the atmosphere pressure to be measured and a second housing adapted to be subjected to ambient pressure, a chamber connected to said first housing, said chamber being open to said atmospheric pressure and closed to said ambient pressure, a pressure responsive means within said first housing, a means within said chamber adapted to be moved by said pressure responsive means, a means outside said chamber and within said second housing for developing a signal upon movement relative thereto of said means inside said chamber, and means responsive to said signal for moving said signal developing means to cancel said signal.

FRANCIS HENRY S. ROSSIRE.

References Cited in the file of this patent

UNITED STATES PATENTS

| Number | Name | Date |
|---|---|---|
| 2,517,556 | Goertz | Aug. 8, 1950 |
| 2,526,669 | Kellogg II, et al. | Oct. 24, 1950 |
| 2,527,797 | Cohen | Oct. 31, 1950 |
| 2,557,856 | Angst et al. | June 19, 1951 |
| 2,568,586 | Hunt et al. | Sept. 18, 1951 |